J. C. POWERS.
CORN PLANTER.
APPLICATION FILED JULY 21, 1919.

1,339,576. Patented May 11, 1920.

INVENTOR,
John C. Powers,
BY
ATTORNEY.

UNITED STATES PATENT OFFICE.

JOHN C. POWERS, OF ROCKWELL CITY, IOWA.

CORN-PLANTER.

1,339,576.  Specification of Letters Patent.  Patented May 11, 1920.

Application filed July 21, 1919. Serial No. 312,117.

*To all whom it may concern:*

Be it known that I, JOHN C. POWERS, a citizen of the United States of America, and resident of Rockwell City, in the county of Calhoun and State of Iowa, have invented certain new and useful Improvements in Corn-Planters, of which the following is a specification.

This invention relates to corn planters and particularly to corn planters of the check-row type.

An object of this invention provides a novel means for operating the checker at certain intervals with relation to the rotation of the traction or ground wheels and it is the purpose of this invention to provide novel means for operating the checker without the employment of the usual check operating wire.

In carrying the invention into practice, I utilize corn planters now in common use and provide novel means whereby the wheels may be set so that the check operating mechanism will be properly timed to trip the planting mechanism when the wheels have traveled predetermined distances to aline the hill transversely of the direction of travel of the planter.

Figure 1:
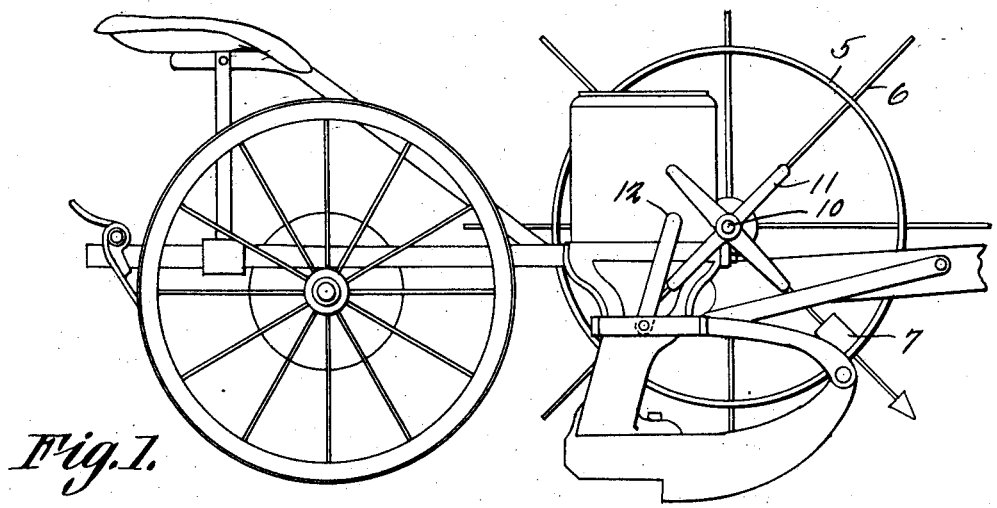

In describing the invention in detail reference will be had to the accompanying drawing forming a part of the specification wherein like characters denote corresponding parts in the several views in which drawing, Figure 1 is a view in elevation of a corn planter embodying the invention, one of the wheels being omitted.

Figure 3:
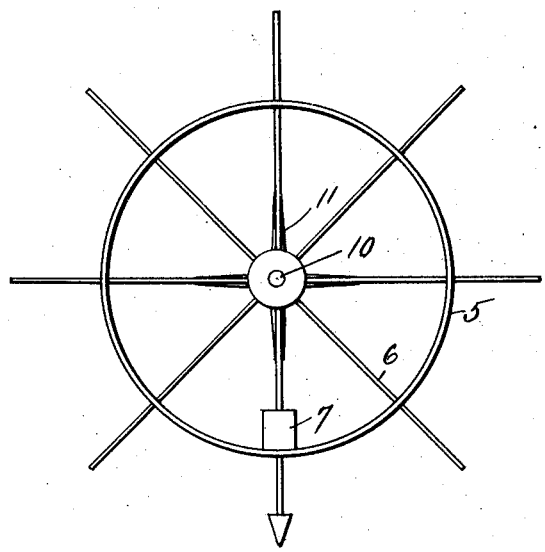
Figure 2:
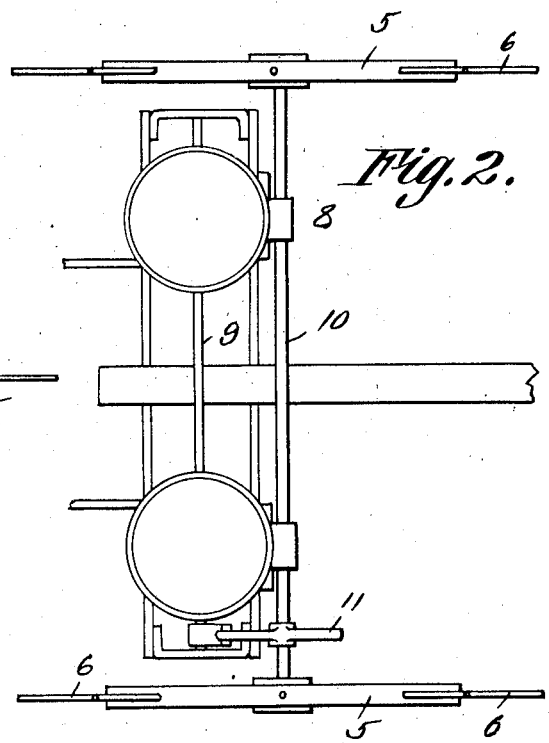

Fig. 2 is a top plan view of a device, and,

Fig. 3 a detail view in elevation of one of the wheels.

In these drawings I have shown a wheel rim 5 having spokes 6 which project beyond the rim or tire and the purpose of these projecting spokes is to insure proper spacing of the hills of corn and to insure against lost motion of the wheels in their travel over the soil. One of the spokes has a weight 7 on it so that the said weight will cause the wheels to swing until the weight is in its lowermost position in order to time the check operating mechanism, it being understood that the wheel will be in the position shown in Fig. 3 at the starting point. Of course, in order to have the weight operated the front truck must be elevated sufficiently to permit the wheels to rotate under the influence of the weight.

The front bearings 8 of an ordinary corn planter 9 have a shaft 10 journaled in them and the wheels heretofore described are mounted to rotate the shaft.

A star wheel 11 is secured on the shaft so that its arms will strike the checker lever 12 and operate it to release corn. The lever 12 is that of the ordinary corn planter which is usually thrown or operated by striking stops on chains which are stretched over a field where the corn planter travels.

It being the purpose of the inventor, however, to obviate the necessity of the use of the said chains and tripping devices, provision will be made for operating this lever by the mechanism just described. Applicant has found that by using a wheel having a circumference of 168 inches he may use a star wheel having four arms so that the lever 12 will be operated four times each time the wheel rotates once and when this relation is maintained the hills will be properly spaced apart as they would be spaced if the planting mechanism were operated by stops on the chains.

When the planter shoes are elevated the wheels are also elevated and the hill markers are brought straight down for the purpose of timing the operating mechanism and insuring that the hills of one row of corn will check with those of the succeeding rows and make it possible to cultivate the corn in both directions.

It is believed that those skilled in the art will understand the construction and operation of this invention without any explanation of the construction of the corn planter itself other than that which has been included in the foregoing specification.

I claim:

In a check row corn planter, a corn planter having a dropper operating lever, a shaft mounted to rotate on the said planter, a member having arms for engaging the lever and operating it at predetermined intervals, wheels on the said shaft, said wheels having spokes projecting from the rims thereof and adapted to enter the soil to insure proper movement of the said wheels, one of said extended spokes having an enlarged piercing head and a weight on each wheel for restoring it to normal position when said wheels are clear of the soil.

JOHN C. POWERS.